(12) United States Patent
Jung (10) Patent No.: US 11,899,138 B2
(45) Date of Patent: Feb. 13, 2024

(54) LIDAR SIGNAL PROCESSING APPARATUS AND LIDAR APPARATUS

(71) Applicant: HYUNDAI MOBIS CO., LTD., Seoul (KR)

(72) Inventor: Chang-Uk Jung, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 950 days.

(21) Appl. No.: 16/680,893

(22) Filed: Nov. 12, 2019

(65) Prior Publication Data

US 2020/0150248 A1    May 14, 2020

(30) Foreign Application Priority Data

Nov. 13, 2018  (KR) .......................... 10-2018-0138981

(51) Int. Cl.
  *G01S 7/48* (2006.01)
  *G01S 7/4865* (2020.01)
  *G01S 7/481* (2006.01)
(52) U.S. Cl.
  CPC .......... *G01S 7/4865* (2013.01); *G01S 7/4808* (2013.01); *G01S 7/4815* (2013.01); *G01S 7/4816* (2013.01)
(58) Field of Classification Search
  USPC ....................................................... 356/5.01
  See application file for complete search history.

(56) References Cited

U.S. PATENT DOCUMENTS

| | | | |
|---|---|---|---|
| 2004/0178945 A1* | 9/2004 | Buchanan | G08G 1/167 342/55 |
| 2008/0119970 A1* | 5/2008 | Campbell | G05D 1/0676 701/4 |

(Continued)

FOREIGN PATENT DOCUMENTS

| | | |
|---|---|---|
| CN | 206147096 U | 5/2017 |
| CN | 108603758 A | 9/2018 |

(Continued)

OTHER PUBLICATIONS

Korean Office Action dated Apr. 11, 2020 from the corresponding Korean Application No. 10-2018-0138981, 5 pp.

(Continued)

*Primary Examiner* — James R Hulka
(74) *Attorney, Agent, or Firm* — MORGAN, LEWIS & BOCKIUS LLP (57) ABSTRACT

A light detection and ranging (LIDAR) signal processing apparatus capable of accurately measuring a distance to an object using an optical means may include: a flight length deriving unit to calculate a flight length of a first laser light emitted from a sensor toward a road with an inclination, a vertical inclination measurement unit to estimate a vertical inclination of the vehicle with respect to the road based on the flight length, a horizontal inclination measurement unit to estimate a horizontal inclination of the vehicle with respect to the road based on the flight length, a reliability determination unit to determine reliability of information detected by the sensor based on the vertical inclination and the horizontal inclination of the vehicle, and a data processing unit to process the detected information when the detected information is reliable.

10 Claims, 5 Drawing Sheets

(56) References Cited

U.S. PATENT DOCUMENTS

| | | | | |
|---|---|---|---|---|
| 2009/0140887 A1* | 6/2009 | Breed | ............... | G01S 13/865 |
| | | | | 701/116 |
| 2009/0312906 A1* | 12/2009 | Bauer | ............... | B60W 40/06 |
| | | | | 701/36 |
| 2015/0204976 A1* | 7/2015 | Bosch | ............... | G01B 11/026 |
| | | | | 356/4.01 |
| 2016/0170090 A1* | 6/2016 | Collins | ............... | G01S 7/003 |
| | | | | 702/5 |
| 2017/0155225 A1* | 6/2017 | Villeneuve | ......... | H01S 3/06758 |
| 2017/0168160 A1* | 6/2017 | Metzler | ............... | G01S 17/86 |
| 2017/0318360 A1* | 11/2017 | Tran | ............... | A63F 13/212 |
| 2017/0323456 A1* | 11/2017 | Matsuura | ............ | G01B 11/002 |
| 2018/0009374 A1* | 1/2018 | Kim | ............... | B60Q 1/085 |
| 2018/0284277 A1* | 10/2018 | LaChapelle | ............ | G01S 17/89 |
| 2019/0051056 A1* | 2/2019 | Chiu | ............... | G06N 3/08 |
| 2019/0061527 A1* | 2/2019 | Hassani | ............... | B60W 30/16 |
| 2019/0283757 A1* | 9/2019 | Honda | ............... | B60W 30/165 |
| 2019/0324475 A1* | 10/2019 | Dean | ............... | G01C 21/3446 |
| 2019/0383939 A1* | 12/2019 | Mori | ............... | G01S 17/42 |
| 2019/0391245 A1* | 12/2019 | Mori | ............... | G01S 17/08 |

FOREIGN PATENT DOCUMENTS

| | | |
|---|---|---|
| KR | 10-1332257 B1 | 11/2013 |
| KR | 10-2017-0070946 A | 6/2017 |

OTHER PUBLICATIONS

Office Action issued in corresponding Chinese Patent Application No. 201911102935.X dated Feb. 24, 2023.

* cited by examiner

LIDAR SIGNAL PROCESSING APPARATUS AND LIDAR APPARATUS

CROSS-REFERENCE TO RELATED APPLICATION

This application claims priority to and the benefit of Korean Patent Application No. 10-2018-0138981, filed on Nov. 13, 2018, the entire contents of which are incorporated herein by reference.

FIELD

The present disclosure relates to a light detection and ranging (LIDAR) signal processing apparatus and a LIDAR apparatus, that are capable of accurately measuring the distance to an object.

BACKGROUND

The statements in this section merely provide background information related to the present disclosure and may not constitute prior art.

A light detection and ranging (LIDAR) apparatus is a kind of a sensor for emitting laser light and then receiving a reflection wave reflected from an obstacle to range the distance to the obstacle by means of a traveling time of the laser light.

Such a LIDAR apparatus is similar to a radio detection and ranging (RADAR) apparatus in terms of a function. However, unlike the RADAR apparatus using a radio wave, the LIDAR apparatus uses light, and thus is also known as 'video RADAR'. Due to the Doppler effect difference between the light and a microwave, the LIDAR has more excellent characteristics than the RDAR in azimuth resolution, distance resolution, or the like.

As the principal performance indexes of the LIDAR, there may be a maximum/minimum measurement distance, a distance resolution, a horizontal field of view, a vertical field of view, an angular resolution, or the like.

Nowadays, in order to improve field of view performance of the LIDAR by extending a steering angle of a laser, techniques such as motor rotation, micromirror, an optical phased array, VCSEL array, and the like are being developed.

For the motor rotation technique that is most frequently used now, extending a horizontal field of view is easy, but extending a vertical field of view desires several laser diodes or a prism optical system.

The prism optical system has a limited ranging performance due to dispersion of laser light, and thus a scheme of employing several multi-channel laser diodes is mainly used.

Such an existing LIDAR apparatus may adopt various motor driving systems in a horizontal direction in consideration of a mounted position of a LIDAR sensor so as to secure a wide field of view, but the field of view in a vertical direction, namely, the height direction of a vehicle, may be limited.

In order to secure the field of view in the vertical direction, a laser diode having a separate channel, which emits laser light so that the laser light is inclined to the vertical direction towards the road, and a photodiode that receives the laser light are employed.

However, we have discovered that because increasing the number of channels is restrictive, and an actual inclination orientation of a vehicle with respect to the road becomes differed by an obstacle on the road, it is difficult to ensure the reliability of obstacle detection information.

For example, when the vehicle passes stones on the road, or passes a slope or pothole in the road, the emission range of the laser light varies and thus an approaching obstacle is not accurately determined.

SUMMARY

The present disclosure provides a LIDAR signal processing apparatus and a LIDAR apparatus that enable the reliability of detected information to be checked by securing in real time a vehicle inclination with respect to a road, which is obtained by subtracting an actually measured vertical inclination and horizontal inclination from an ideal vertical inclination and horizontal inclination of an existing vehicle using a sensor for emitting laser light so that the laser light is inclined towards the road and a flight length obtained through the sensor.

In accordance with an exemplary embodiment, a light detection and ranging (LIDAR) signal processing apparatus includes: a flight length deriving unit configured to derive a flight length of a first laser light emitted from a sensor of a vehicle, the emitted first laser light directed at an incline towards a road on which the vehicle is present; a vertical inclination measurement unit configured to estimate a vertical inclination of the vehicle with respect to the road based on the flight length; a horizontal inclination measurement unit configured to estimate a horizontal inclination of the vehicle with respect to the road based on the flight length; a reliability determination unit configured to determine reliability of information detected by the sensor based on the vertical inclination and the horizontal inclination of the vehicle; and a data processing unit configured to process the detected information as valid data when the detected information is reliable, and process the detected information as invalid data or output a warning message when the detected information is not reliable.

In an embodiment, the flight length deriving unit may calculate a Time of Flight (TOF) using a reflection light received from a first position on the road in response to the first laser light emitted toward the road so as to be inclined at a first angle with respect to a height direction of the vehicle, and derive the flight length of the first laser light using the calculated TOF.

In one form, the vertical inclination measurement unit may calculate an actual vertical inclination based on the derived flight length of the first laser light and a mounted height of the sensor of the vehicle, and estimate the vertical inclination of the vehicle by subtracting the actual inclination from an ideal vertical inclination. In addition, the horizontal inclination measurement unit may determine whether left and right reference patterns (PT) of the first laser light are within an error tolerance range, calculate an actual horizontal inclination from an ideal horizontal inclination when left and right reference patterns (PT) are within the error tolerance range, and estimate the horizontal inclination of the vehicle by subtracting the actual horizontal inclination from the ideal horizontal inclination.

In an embodiment, the reliability determination unit may determine the detected information by the sensor as being reliable when the vertical inclination and the horizontal inclination of the vehicle are within a normal range based on an ideal number measured in a state where the vehicle and the road are both parallel to each other, and may determine the detected information as being unreliable when the inclinations are out of the normal range.

In accordance with another exemplary embodiment, a light detection and ranging (LIDAR) signal processing method includes: a flight length deriving step for deriving a flight length of first laser light emitted from a sensor of a vehicle where the emitted first laser light is directed at an incline towards a road on which the vehicle is present; a vertical inclination and horizontal inclination estimation step for estimating a vertical inclination and a horizontal inclination of the vehicle with respect to the road based on the flight length; a reliability determination step for determining reliability of information detected from the sensor based on the vertical inclination and the horizontal inclination of the vehicle; and a data processing step for processing the detected information as valid data when the detected information is determined as being reliable, and processing the detected information as invalid data or outputting a warning message when the detected information is determined as being unreliable.

In an embodiment, in the flight length deriving step, a Time of Flight (TOF) may be calculated using a reflection light received from a first position on the road in response to the first laser light emitted toward the road so as to be inclined at a first angle with respect to a height direction of the vehicle, and the flight length of the first laser light may be derived using the calculated TOF.

In an embodiment, in the vertical inclination and horizontal inclination estimation step, an actual vertical inclination may be calculated based on the derived flight length of the first laser light and a mounted height of the sensor of the vehicle, and the vertical inclination of the vehicle may be calculated by subtracting the actual vertical inclination from an ideal vertical inclination. In other form, the step of estimating the vertical inclination and horizontal inclination may include: determining whether left and right reference patterns (PT) of the first laser light are within an error tolerance range; calculating an actual horizontal inclination from an ideal horizontal inclination when the left and right reference patterns (PT) are within the error tolerance range; and estimating the horizontal inclination by subtracting the actual horizontal inclination from the ideal horizontal inclination.

In an embodiment, in the reliability determination step, the detected information may be determined to be reliable when the vertical inclination and the horizontal inclination of the vehicle are within a normal range on the basis of an ideal number measured in a state where the vehicle and the road are both parallel to each other, and the detected information may be determined to be unreliable when out of the normal range.

In accordance with yet another exemplary embodiment, a light detection and ranging (LIDAR) apparatus includes: a sensor configured to emit first laser light toward a road on which a vehicle is present and configured to receive a reflection wave, the emitted first laser light directed at a first angle towards the road; a flight length deriving unit configured to derive a flight length of the first laser light; a vertical inclination measurement unit configured to estimate a vertical inclination of the vehicle with respect to the road based on the flight length of the first laser light; a horizontal inclination measurement unit configured to estimate a horizontal inclination of the vehicle with respect to the road based on the flight length of the first laser light; a reliability determination unit configured to determine reliability of information detected by the sensor based on the vertical inclination and the horizontal inclination of the vehicle; and a data processing unit configured to process the information detected from the sensor as valid data when the information detected from the sensor is determined as being reliable, and process the information detected by the sensor as invalid data or output a warning message when the information detected from the sensor is determined as being unreliable.

In an embodiment, the sensor may include: a plurality of laser diodes installed in the vehicle so as to be able to emit beams of laser light of various channels at various angles; and a plurality of photodiodes configured to be able to receive the beams of the laser light in various channels for each laser diode.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The embodiments of the present disclosure are provided to explain exemplary forms of the present disclosure. The following embodiments may be changed into various other forms, and the scope of the present disclosure will not be limited thereto. In the drawings, the thickness or size of layers may be exaggerated for clarity and convenience of description.

The terms and words used in the following description are to describe embodiments but are not limited the inventive concept. As used herein, singular forms, unless contextually defined otherwise, may include plural forms. Also, the terms "comprise" and/or "comprising" are used herein to specify the present of stated shapes, numbers, steps, operations, members, elements, and/or groups thereof but do not preclude the presence or addition of one or more other shapes, numbers, operations, members, elements and/or groups thereof.

Hereinafter, the embodiments of the present disclosure will be described with reference to the drawings which schematically illustrate the embodiments. In the drawings, for example, depending on a manufacturing technology and/or tolerance, modifications of illustrated shapes may be made. Accordingly, it should be understood that the embodiments of the present disclosure are not limited to a particular shape of an area shown in the specification and may include, for example, a change in shape caused during a manufacturing process.

Hereinafter, a LIDAR signal processing apparatus and a LIDAR apparatus according to various embodiments of the present disclosure will be described in detail with reference to the accompanying drawings.

Figure 1:
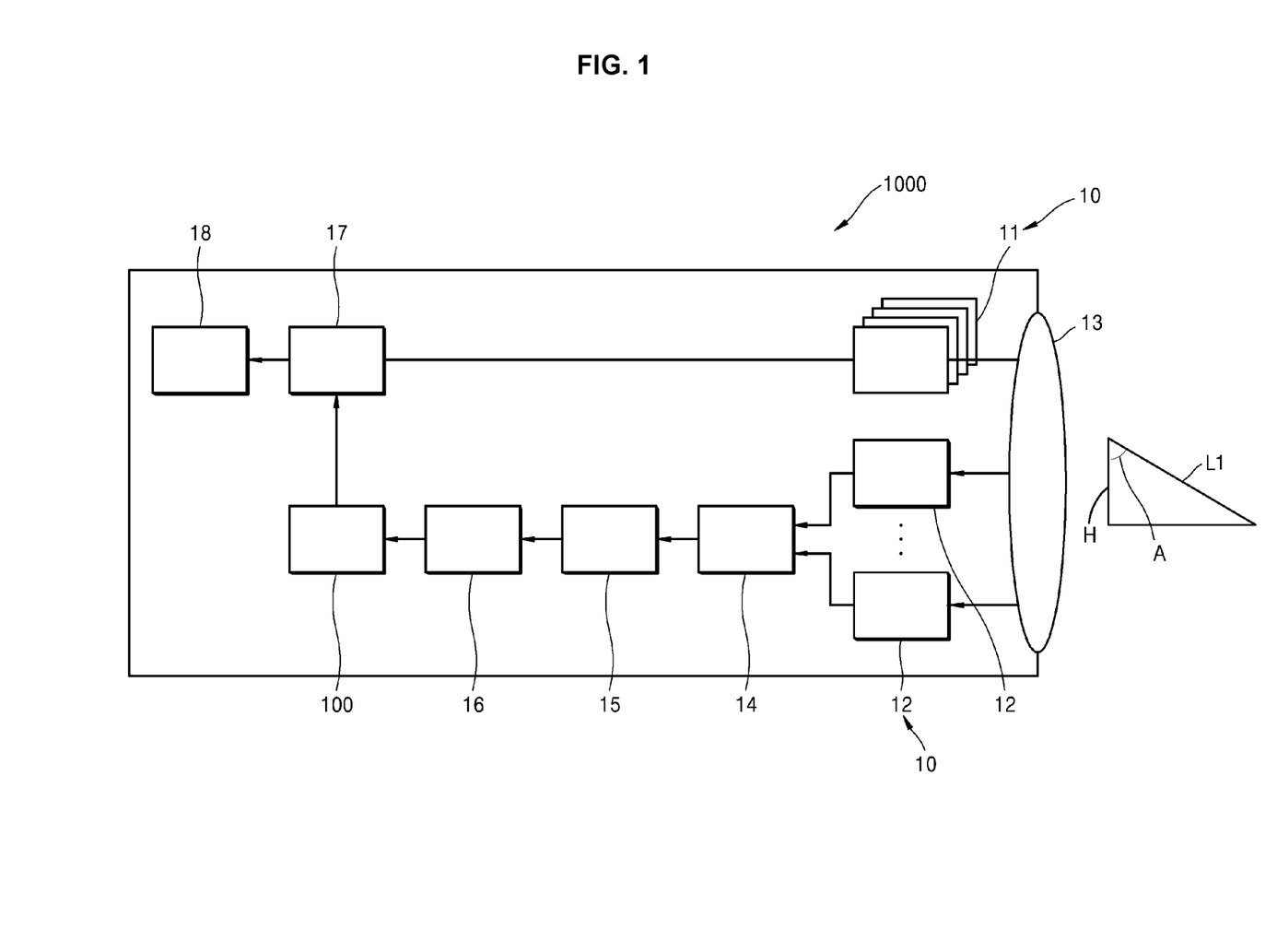
FIG. 1 is a schematic diagram schematically showing a LIDAR signal processing apparatus and a LIDAR apparatus.
Figure 2:
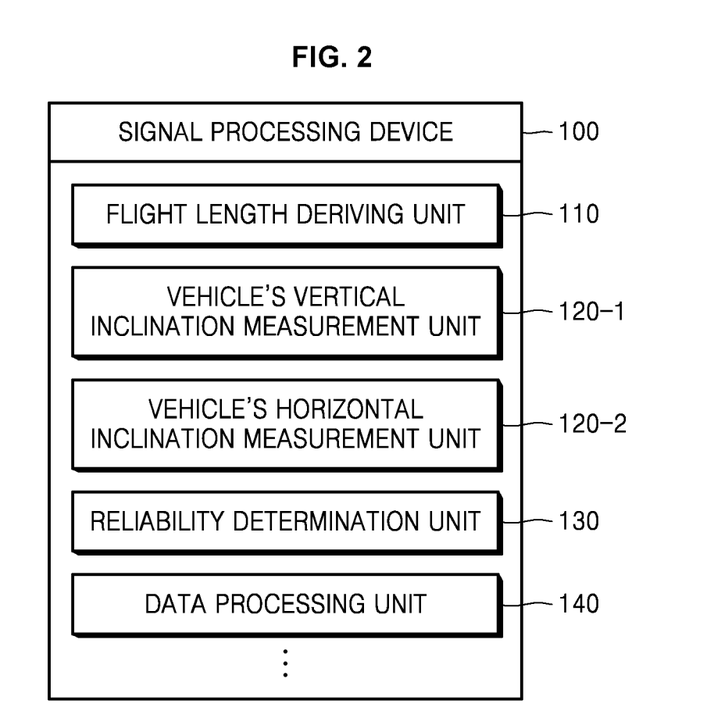
FIG. 2 is a block diagram showing the LIDAR signal processing apparatus of FIG. 1.
Figure 3:
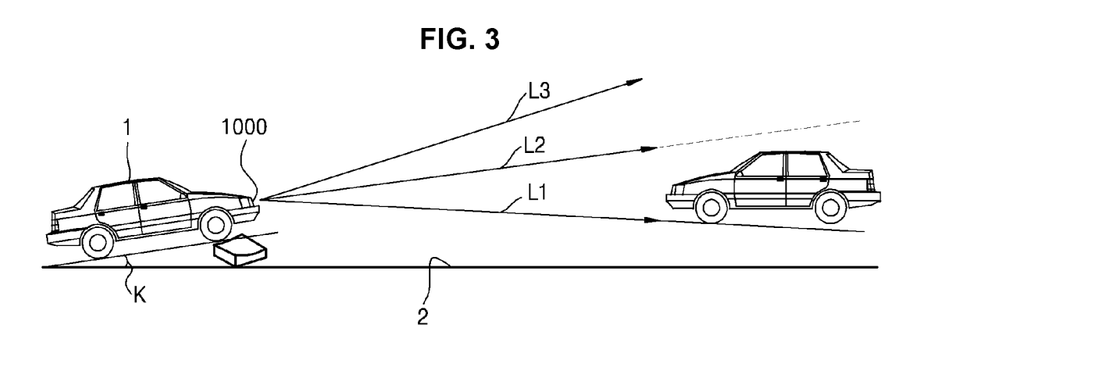
FIG. 3 is a schematic diagram showing an actual inclination state of a vehicle in which the LIDAR apparatus of FIG. 1 is installed.
Figure 4:
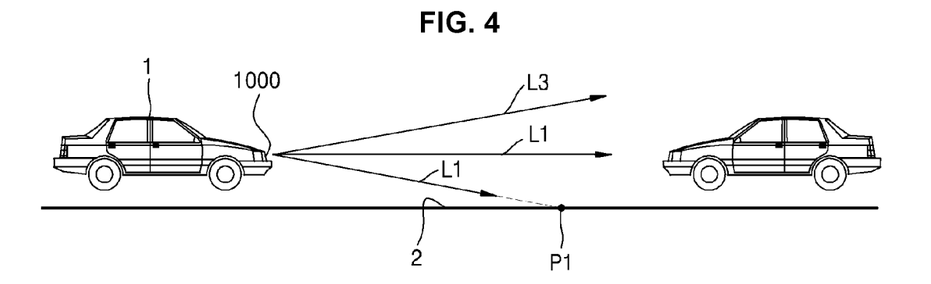
FIG. 4 is a schematic diagram showing an ideal vertical inclination state of a vehicle in which the LIDAR apparatus of FIG. 1 is installed.
Figure 5:
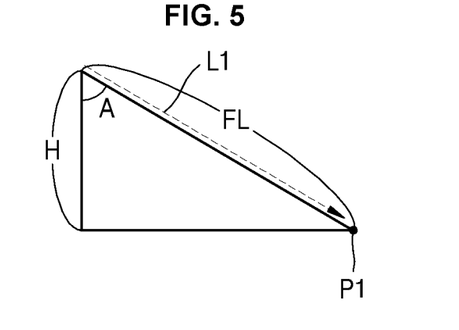
FIG. 5 is a figure showing a vertical inclination measurement principle of FIG. 3 or FIG. 4.
Figure 6:
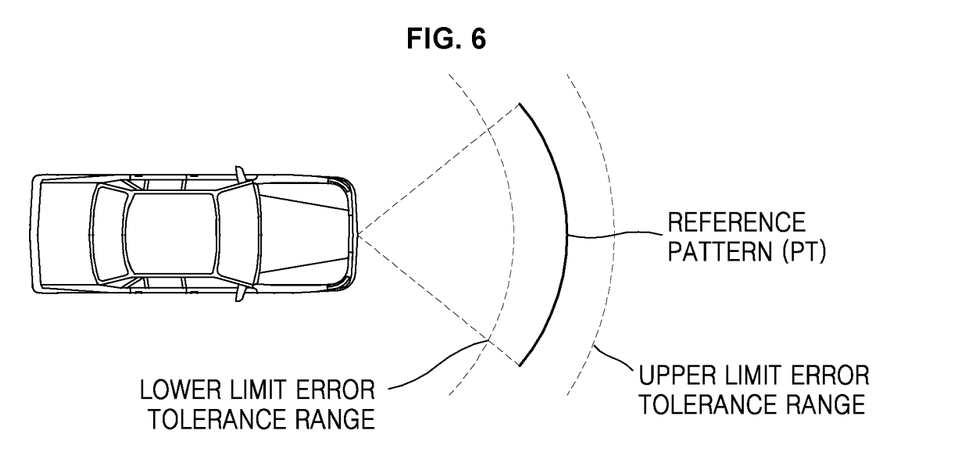
FIG. 6 is a schematic diagram showing a horizontal inclination state of the vehicle of FIG. 1.

FIG. 1 is a schematic diagram schematically showing a LIDAR signal processing apparatus 100 and a LIDAR apparatus 1000 including the same in one form of the present disclosure, FIG. 2 is a block diagram showing the LIDAR signal processing apparatus 100 of FIG. 1, FIG. 3 is a schematic diagram showing an actual inclination state of a vehicle 1 in which the LIDAR apparatus 1000 of FIG. 1 is installed, and FIG. 4 is a schematic diagram showing an ideal vertical inclination state of the vehicle 1 in which the LIDAR apparatus 1000 of FIG. 1 is installed. FIG. 5 is a figure showing an inclination measurement principle of FIG. 3 or FIG. 4. FIG. 6 is a schematic diagram showing a horizontal inclination state of the vehicle of FIG. 1.

First, as illustrated in FIGS. 1 and 2, the LIDAR apparatus 1000 may include a sensor 10, and a LIDAR signal processing device 100.

For example, as exemplarily shown in FIG. 3, the sensor 10 may be a kind of a LIDAR sensor that may emit first laser light L1 so that the first laser light L1 is inclined towards a road 2 on which the vehicle 1 is present, and the sensor 10 may receive a reflection wave.

More specifically, as illustrated in FIG. 1, the sensor 10 may include a plurality of laser diodes 11 installed in the vehicle 1 so as to emit beams L1, L2, and L3 of laser light of various channels at various angles with respect to the vertical direction, and a plurality of photodiodes 12 that are capable of receiving the laser light beams L1, L2 and L3 of various channels for each laser diode. Here, the installment angles, the installment number, or the like of the laser diodes 11 are not limited to those shown in the drawing and may be employed in various ways.

In addition, the laser diode may be a semiconductor laser diode having two electrodes for a laser operation. More specifically, the laser diode may be configured of three layers with GaAs, which is an active layer, interposed between two layers of AlxGa1-xAs. The refractive index n1 of GaAs and the refractive index n2 of AlxGa1-xAs may be designed so as to be able to confine light generated in the active layer, and the generated light may be emitted from side surfaces of the active layer. In addition, the thickness of the active layer may be usually made smaller than the wavelength of the generated light, and since, unlike the excitation by light or electrons, the population inversion distribution may be achieved just by flowing the current, it is easy to be handled.

In addition, for example, as illustrated in FIGS. 1 to 6, the LIDAR signal processing apparatus 100 may include a flight length derivation unit 110 for deriving a flight length FL of the first laser light L1, a vehicle's vertical inclination measurement unit 120-1 for estimating a vehicle's vertical inclination K with respect to the road based on the flight length FL, a vehicle's horizontal inclination measurement unit 120-2 for estimating a vehicle's horizontal inclination with respect to the road from the flight length FL, a reliability determination unit 130 for determining the reliability of information detected by the sensor 10 on the basis of the vehicle's vertical inclination K and the vehicle's horizontal inclination with respect to the road, and a data processing unit 140 for processing the information detected from the sensor 10 as valid data when the detected information is determined to be reliable, and for processing the information detected from the sensor 10 as invalid data or outputting a warning message when the detected information is not determined to be reliable.

In detail, for example, as illustrated in FIGS. 4 and 5, the flight length derivation unit 110 may calculate a time of flight (TOF) using a reflection light received from a first position P1 on the road 2 in response to the first laser light L1 that has been emitted toward the road 2 to be inclined at a first angle A with respect to the height direction of the vehicle (1), and derive the flight length L1 of the first laser light using the calculated TOF.

In one form, as illustrated in FIG. 5, the vehicle's vertical inclination measurement unit 120-1 may calculate an actual inclination A based on the derived flight length FL and a mounted height H of the sensor 10 for emitting the first laser light L1, and estimate the vehicle's vertical inclination K with respect to the road by subtracting the actual inclination A from an ideal inclination Ideal A.

Here, the inclination A indicates an inclination angle at which the laser light is vertically inclined on the basis of the vehicle 1, and may be obtained using a cosine value.

In other words, cosine A is the mounted height H over the flight length FL, and since the value of cosine A is known, the value of A may also be obtained.

When the value of A is obtained, the vehicle's vertical inclination K in FIG. 3 may be estimated with respect to the road by subtracting the actual vertical inclination A from the ideal inclination Ideal A.

Similarly, as illustrated in FIG. 6, the vehicle's horizontal inclination measurement unit 120-2 may determine whether left and right reference patterns PT are within an error tolerance range, namely, within an upper limit error tolerance range and a lower limit error tolerance range, and, when the left and right reference patterns PT are within the error tolerance range, calculate an actual horizontal inclination from the ideal horizontal inclination, and measure the vehicle's horizontal inclination with respect to the road by subtracting the actual horizontal inclination from the ideal horizontal inclination.

Meanwhile, for example, if the vehicle's vertical inclination K and vehicle's horizontal inclination with respect to the road are within a normal range on the basis of an ideal number measured in a state where the vehicle 1 is parallel to the road 2, the reliability determination unit 130 determines that the detected information is reliable. Otherwise, the reliability determination unit 130 determines that the detected information is not reliable.

Hereinafter, an operation process of the LIDAR signal processing apparatus 100 in one form of the present disclosure will be described in detail. First, the flight length FL of the first laser light L1, which is emitted so as to be inclined towards the road 2 from the vehicle 1, may be derived.

Here, the TOF is calculated using the reflection light received from the first position P1 with respect to the first laser light L1, which has been emitted so as to be inclined at the first angle A towards the road 2, on the basis of the height direction of the vehicle 1, and the flight length FL of the first laser light L1 may be derived using the same.

Then, the vehicle's vertical inclination K with respect to the road may be estimated from the flight length FL. Here, the actual inclination A may be calculated with reference to the derived flight length FL and the mounted height H of the sensor 10 that emits the first laser light L1, and the vehicle's vertical inclination K with respect to the road may be estimated by subtracting the actual inclination A from the ideal inclination Ideal A.

Then, it is determined whether the left and right reference patterns PT are within an error tolerance range, namely, within an upper limit error tolerance range and a lower limit error tolerance range, and in case of being within the error tolerance range, the actual horizontal inclination is calculated from the ideal horizontal inclination, and the vehicle's horizontal inclination with respect to the road may be measured by subtracting the actual horizontal inclination from the ideal horizontal inclination.

Then, the reliability of the information detected by the sensor 10 may be determined on the basis of the vehicle's vertical inclination and the vehicle's horizontal inclination with respect to the road. Here, if the vehicle's vertical inclination K and the vehicle's horizontal inclination are within a normal range on the basis of an ideal number measured in a state where the vehicle 1 is parallel to the road 2, the detected information is determined to be reliable. Otherwise, the detected information is not determined to be reliable.

Then, when the detected information is determined to be reliable, the information detected from the sensor 10 is processed as valid data or a priority is imparted thereto, and when determined not to be reliable, the information detected from the sensor 10 is processed as invalid data or a warning message may be output.

Therefore, the reliability of detected information may be checked by securing in real time the vehicle's vertical inclination K obtained by subtracting the actually measured inclination A from the ideal inclination of the existing vehicle using a sensor for emitting the first laser light L1 so that the first laser light is inclined in the vertical direction towards the road 2 and the flight length obtained through the sensor. In this way, only valid data may be processed to improve the reliability of obstacle detection information, and the accuracy of the detection information may be improved by correcting the obstacle detection information or the like.

Besides, as illustrated in FIG. 1, the LIDAR apparatus 1000 in one form of the present disclosure may include: an optical system 13 formed of a combination of lenses, prisms, reflection mirror, or the like for leading the paths of beams of the laser light, a low-noise amplifier for amplifying signals received from photodiodes 12, a comparator 15 for comparing received signals and performing selection, a time-to-digital converter 16 for calculating a transmission and reception time, a driving control unit 17 for driving the laser diode 11, other connectors, and a communication unit 18 such as a wireless transmission and receiving device. However, the LIDAR apparatus 1000 of the present disclosure is not limited to those illustrated in the drawing and various kinds and forms of electronic components may be applied thereto.

Figure 7:
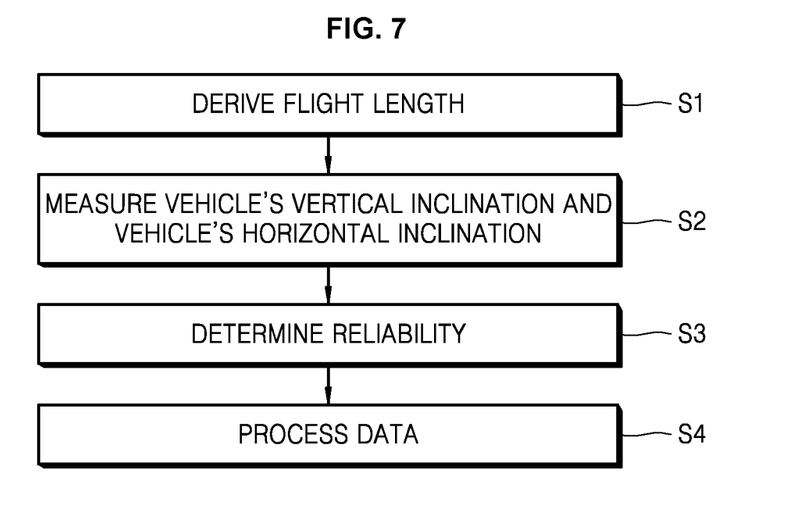
FIG. 7 is a flowchart showing a LIDAR signal processing method.

FIG. 7 is a flowchart showing a LIDAR signal processing method according to some embodiments of the present disclosure.

As illustrated in FIGS. 1 to 7, a LIDAR signal processing method in another form of the present disclosure may include: a flight length derivation step S1 for deriving the flight length of the first laser light L1 that has been emitted so as to be inclined towards the road 2 from the vehicle 1, a vehicle's vertical inclination and vehicle's horizontal inclination estimation step S2 for estimating the vehicle's vertical inclination and horizontal inclination with respect to the road from the flight length, a reliability determination step S3 for determining the reliability of the information detected from the sensor 10 on the basis of the vehicle's vertical inclination and the vehicle's horizontal inclination, a data processing step S4 for processing the information detected from the sensor 10 as valid data or imparting the priority when the detected information is reliable, and processing the detected information as invalid data or outputting a warning message.

Here, the flight length derivation step S1 may be a step for calculating the TOF using the reflection light received from the first position P1 with respect to the first laser light L1, which has been emitted so as to be inclined at the first angle A towards the road 2 on the basis of the height direction of the vehicle 1, and for deriving the flight length FL of the first laser light L1 using the same.

In addition, the vehicle's vertical inclination and vehicle's horizontal inclination estimation step S2 may be a step for calculating the actual inclination A with reference to the derived flight length FL and the mounted height H of the sensor 10 for emitting the first laser light L1, estimating the vehicle's vertical inclination K by subtracting the actual inclination A from an ideal inclination Ideal A, determining whether the left and right reference patterns are within the error tolerance range to calculate the actual horizontal inclination from the ideal horizontal inclination in case of being within the error tolerance range, and measuring the vehicle's horizontal inclination with respect to the road by subtracting the actual horizontal inclination from the ideal horizontal inclination.

Furthermore, the reliability determination step S3 may be a step for determining that the detected information is reliable, if the vehicle's vertical inclination K and the vehicle's horizontal inclination are within a normal range on the basis of an ideal number measured in a state where the vehicle 1 is parallel to the road 2, and for determining that the detected information is not reliable, otherwise.

Figure 8:
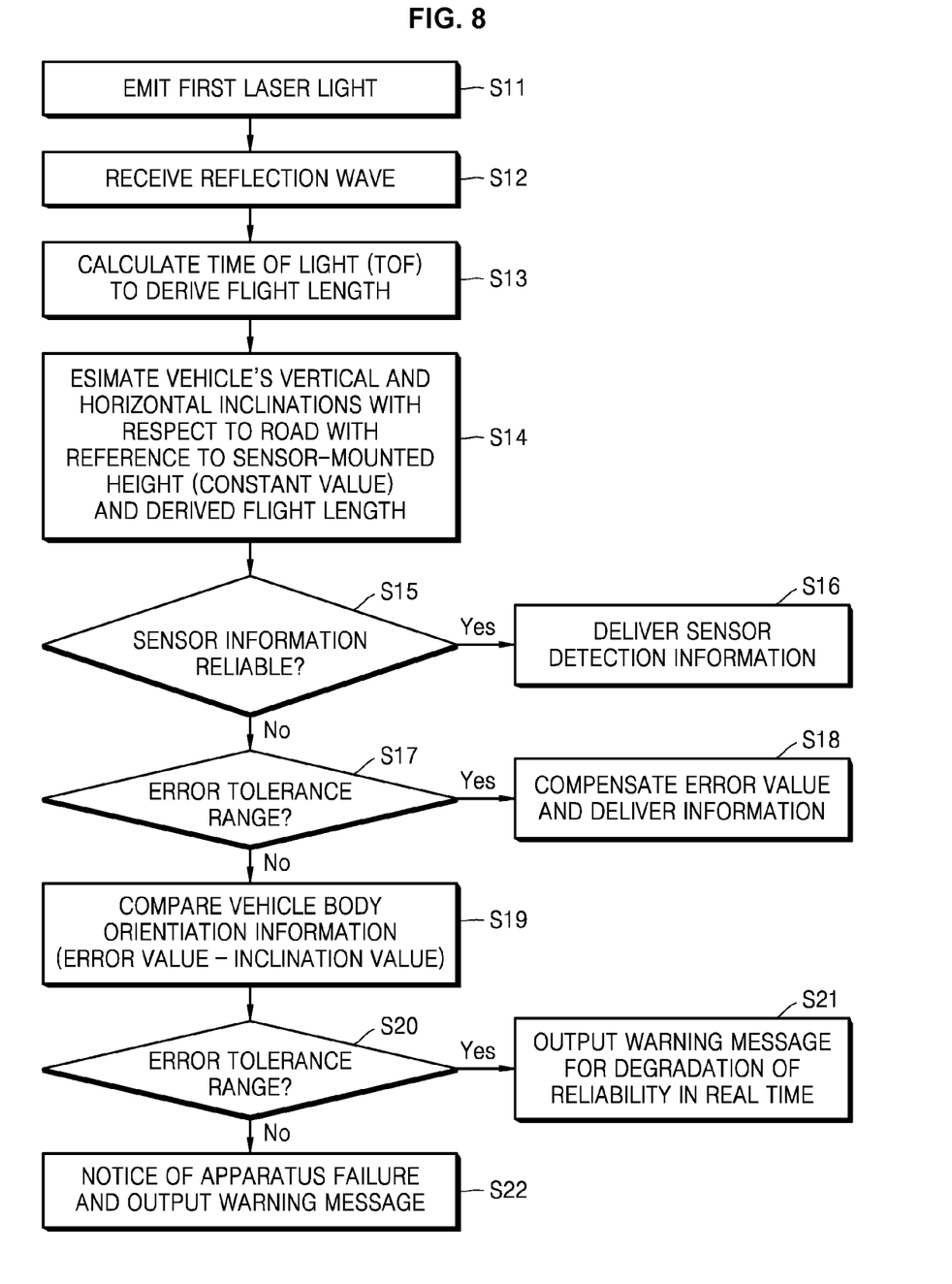
FIG. 8 is a flowchart showing an example of the LIDAR signal processing method in FIG. 7.

FIG. 8 is a flowchart showing an example of the LIDAR signal processing method in FIG. 7.

In detail, for example, as illustrated in FIGS. 1 to 8, in a LIDAR signal processing method according to some other embodiments of the present disclosure, first, the first laser light may be emitted (step S11) in order to derive the flight length FL, and receive a reflection wave thereto (step S12).

Then the TOF is calculated using the difference between a transmission time and a reception time and the flight length FL may be derived therethrough (step S13).

Then, the vehicle's vertical inclination K and the vehicle's horizontal inclination with respect to the road may be estimated with referent to the sensor-mounted height H, which is a constant, and the derived flight length FL (step S14).

Then, the reliability of the sensor information through the vehicle's vertical inclination K and the vehicle's horizontal inclination (step S15), and when it is determined that the sensor information is reliable, the sensor detection information may be delivered as valid data (step S16).

When the sensor information is not determined to be reliable, it is checked whether the sensor information is within the error tolerance range (step S17). When within the error tolerance range, the error value may be compensated and the compensated sensor information may be delivered (step S18).

When the sensor information is out of the error tolerance range, an inclination value is subtracted from the error value and then the subtracted value is compared with vehicle's orientation information (step S19). When the comparison result is also out of the error tolerance range, it may be determined that real time reliability degradation occurs and a warning message is output (step S21). When within the error tolerance range, a simple apparatus failure notice or a warning message may be output (step S22).

According to some embodiments of the present disclosure, the reliability of detected information may be checked by securing in real time a vehicle inclination with respect to a road, which is obtained by subtracting an actually measured vertical inclination and horizontal inclination from an ideal vertical inclination and horizontal inclination of an existing vehicle, and through this, only valid data may be processed to improve the reliability of obstacle detection information. In addition, the accuracy of the detection information may be enhanced by correcting the obstacle detection information. Not to mention, the scope of the present disclosure is not limited by the above-described effect.

Therefore, it should be understood that since the configurations of the embodiments and drawings described herein are merely exemplary embodiments of the present disclosure, but do not include all the technical spirits of the present disclosure, there may be provided various equivalents and modifications which can be substituted for the above configurations. Therefore the scope of true technical protection of the present disclosure should be defined by the technical idea of the appended claims.

What is claimed is:

1. A light detection and ranging (LIDAR) signal processing apparatus comprising:
   a flight length deriving unit configured to derive a flight length of a first laser light emitted from a sensor of a vehicle, the emitted first laser light directed at an incline towards a road on which the vehicle is present;
   a vertical inclination measurement unit configured to estimate a vertical inclination of the vehicle with respect to the road based on the flight length;
   a horizontal inclination measurement unit configured to estimate a horizontal inclination of the vehicle with respect to the road based on the flight length;
   a reliability determination unit configured to determine reliability of information detected by the sensor based on the vertical inclination and the horizontal inclination of the vehicle; and
   a data processing unit configured to:
      when the detected information is reliable, process the detected information as valid,
      when the detected information is not reliable and the detected information is within a first error tolerance range, process the detected information as invalid data and compensate the detected information with an error value,
      when the detected information is not reliable and the detected information is out of the first error tolerance range, subtract an inclination value from the error value and compare the subtracted inclination value with vehicle's orientation information, and
      when the comparison result is out of the first error tolerance range, output a warning message, wherein the vertical inclination measurement unit is configured to:
      calculate an actual vertical inclination based on the derived flight length of the first laser light and a mounted height of the sensor of the vehicle from the road to the sensor in a vertical direction, and
      estimate the vertical inclination of the vehicle by subtracting the actual inclination from an ideal vertical inclination.

2. The LIDAR signal processing apparatus of claim 1, wherein the flight length deriving unit is configured to calculate a Time of Flight (TOF) using a reflection light received from a first position on the road in response to the first laser light emitted toward the road so as to be inclined at a first angle with respect to a height direction of the vehicle, and configured to derive the flight length of the first laser light using the calculated TOF.

3. The LIDAR signal processing apparatus of claim 1, wherein the horizontal inclination measurement unit is configured to:
   determine whether left and right reference patterns of the first laser light are within a second error tolerance range,
   calculate an actual horizontal inclination from an ideal horizontal inclination when the left and right reference patterns are within the second error tolerance range, and
   estimate the horizontal inclination of the vehicle by subtracting the actual horizontal inclination from the ideal horizontal inclination.

4. The LIDAR signal processing apparatus of claim 3, wherein the reliability determination unit is configured to determine the detected information by the sensor as being reliable when the vertical inclination and the horizontal inclination of the vehicle are within a normal range based on an ideal number measured in a state where the vehicle and the road are both parallel to each other.

5. A light detection and ranging (LIDAR) apparatus for a vehicle, the LIDAR apparatus comprising:
   a sensor configured to emit a first laser light toward a road on which a vehicle is present, the emitted first laser light directed at a first angle towards the road, the sensor configured to receive a reflection wave;
   a flight length deriving unit configured to derive a flight length of the first laser light;
   a vertical inclination measurement unit configured to estimate a vertical inclination of the vehicle with respect to the road based on the flight length of the first laser light;
   a horizontal inclination measurement unit configured to estimate a horizontal inclination of the vehicle with respect to the road based on the flight length of the first laser light;
   a reliability determination unit configured to determine reliability of information detected by the sensor based on the vertical inclination and horizontal inclination of the vehicle; and
   a data processing unit configured to:
      when the information detected by the sensor is reliable, process the information detected from the sensor as valid data,
      when the information detected by the sensor is not reliable and the information detected by the sensor is within a first error tolerance range, process the information detected from the sensor as invalid data and compensate the information detected by the sensor with an error value, when the information detected by the sensor is not reliable and the information detected by the sensor is out of the first error tolerance range, subtract an inclination value from the error value and compare the subtracted inclination value with vehicle's orientation information, and when the comparison result is out of the first error tolerance range, output a warning message, wherein the vertical inclination measurement unit is configured to:

calculate an actual vertical inclination based on the derived flight length of the first laser light and a mounted height of the sensor of the vehicle from the road to the sensor in a vertical direction, and estimate the vertical inclination of the vehicle by subtracting the actual inclination from an ideal vertical inclination.

6. The LIDAR apparatus of claim 5, wherein the sensor comprises:

a plurality of laser diodes installed in the vehicle and configured to emit beams of laser light of various channels at various angles; and a plurality of photodiodes configured to receive the beams of the laser light in various channels for each laser diode.

7. A light detection and ranging (LIDAR) signal processing method, comprising:

deriving a flight length of a first laser light emitted from a sensor of a vehicle, the emitted first laser light directed at an incline towards a road on which the vehicle is present;

estimating a vertical inclination and a horizontal inclination of the vehicle with respect to the road based on the flight length;

determining reliability of information detected from the sensor based on the vertical inclination and the horizontal inclination of the vehicle;

when the detected information is reliable, processing the detected information as valid data;

when the detected information is not reliable and the detected information is within a first error tolerance range, processing the detected information as invalid data and compensating the detected information with an error value;

when the detected information is not reliable and the detected information is out of the first error tolerance range, subtracting an inclination value from the error value and comparing the subtracted inclination value with vehicle's orientation information; and when the comparison result is out of the first error tolerance range, outputting a warning message, wherein in estimating the vertical inclination and horizontal inclination, an actual vertical inclination is calculated based on the derived flight length of the first laser light and a mounted height of the sensor of the vehicle from the road to the sensor in a vertical direction, and the vertical inclination of the vehicle is calculated by subtracting the actual vertical inclination from an ideal vertical inclination.

8. The method of claim 7, wherein in deriving the flight length of the first laser light, a Time of Flight (TOF) is calculated using a reflection light received from a first position on the road in response to the first laser light emitted toward the road so as to be inclined at a first angle with respect to a height direction of the vehicle, and the flight length of the first laser light is derived using the calculated TOF.

9. The method of claim 7, estimating the vertical inclination and horizontal inclination includes:

determining whether left and right reference patterns of the first laser light are within a second error tolerance range, calculating an actual horizontal inclination from an ideal horizontal inclination when the left and right reference patterns are within the second error tolerance range, and estimating the horizontal inclination of the vehicle by subtracting the actual horizontal inclination from the ideal horizontal inclination.

10. The method of claim 7, wherein in determining the reliability of the detected information, the detected information is determined as being reliable when the vertical inclination and the horizontal inclination of the vehicle are within a normal range based on an ideal number measured in a state where the vehicle and the road are both parallel to each other.

* * * * *